No. 635,659. Patented Oct. 24, 1899.
J. T. CLARK.
GARDEN CULTIVATOR.
(Application filed Dec. 7, 1898.)
(No Model.)
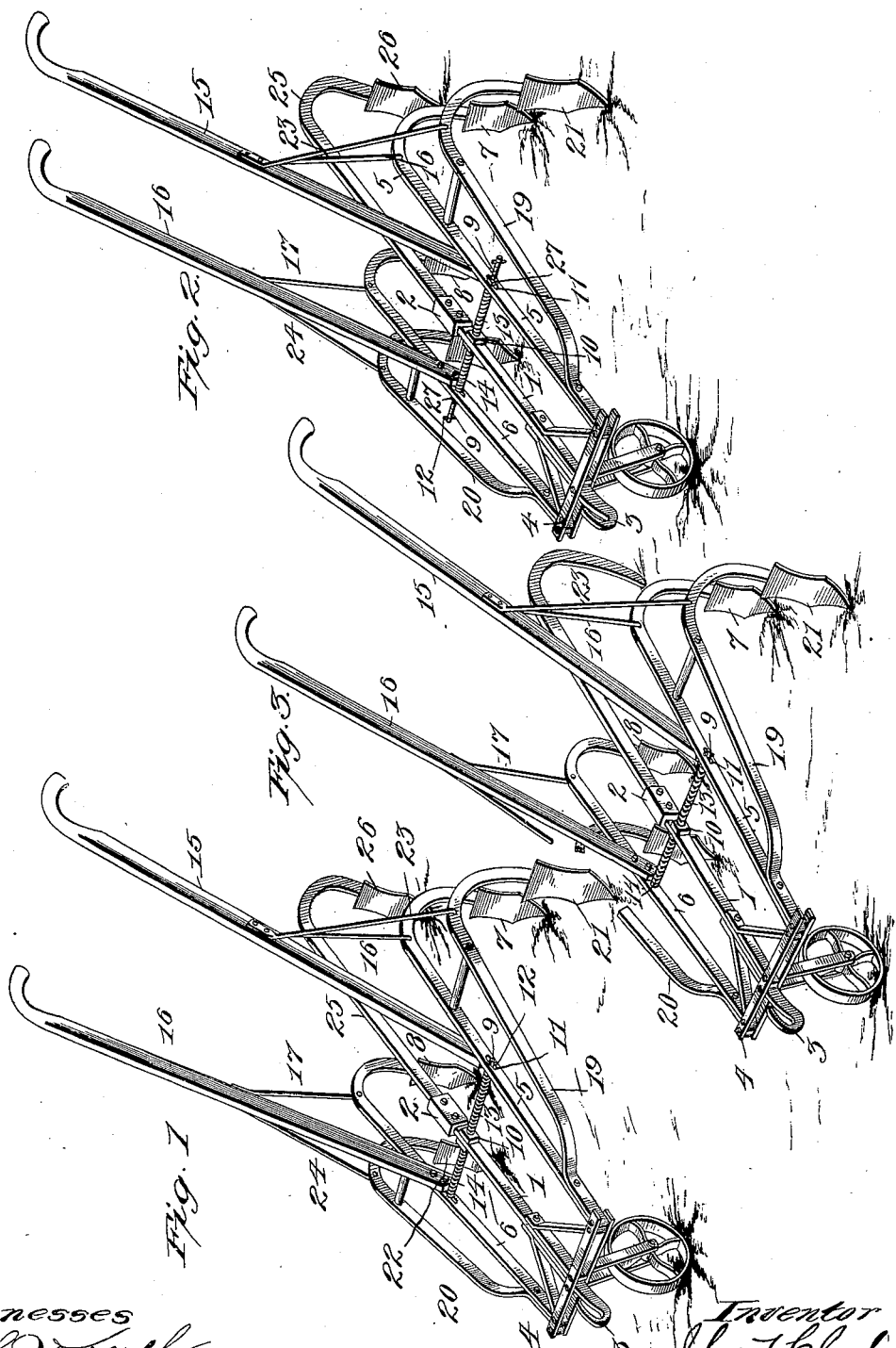

UNITED STATES PATENT OFFICE.

JOHN T. CLARK, OF NEAR ST. JOSEPH, MISSOURI.

GARDEN-CULTIVATOR.

SPECIFICATION forming part of Letters Patent No. 635,659, dated October 24, 1899.

Application filed December 7, 1898. Serial No. 698,542. (No model.)

*To all whom it may concern:*

Be it known that I, JOHN T. CLARK, a citizen of the United States, residing near St. Joseph, in the county of Andrew and State of Missouri, have invented certain new and useful Improvements in Garden-Cultivators; and I do hereby declare the following to be a full, clear, and exact description of the invention, such as will enable others skilled in the art to which it appertains to make and use the same.

The object of my invention is to produce a novel garden-cultivator the teeth of which may be laterally adjusted to accommodate different widths of plant-rows while the cultivator is in motion and without the necessity of releasing the handles by means of which the device is guided and steadied.

A further object of the invention is to so organize its structural elements that its form and arrangement may be quickly converted to serve a variety of uses.

To the accomplishment of these objects the invention consists generally in providing a center beam with a head to which are pivotally connected a plurality of pivoted tooth-shanks laterally spring-actuated in one direction and designed to be actuated in the opposite direction in opposition to the springs through the manipulation of the handles of the cultivator, which are operatively connected to and in the present instance are actually supported by the movable shanks. Additional tooth-shanks are secured to the pivoted shanks, and provision is made for coupling tooth-plow or marker shanks to the extremity of the center beam.

Various other structural details and the several adaptations of my device will be fully described hereinafter and succinctly pointed out in the appended claims.

Referring to the drawings, Figure I is a perspective view of my cultivator in its widest adjustment. Fig. II is a similar view of the device in its narrowest adjustment, showing the adjusting-nuts 27; and Fig. III is still another view showing the center tooth replaced by a marker.

Referring to the numerals on the drawings, 1 indicates the center beam of my cultivator, provided at its rear extremity with a coupling 2 and at its front extremity with a clevis 3.

Immediately in the rear of the clevis is fixed a transverse head 4, preferably comprising a pair of metal plates, between the extremities of which are pivoted the forward ends of a pair of adjustable tooth-shanks 5 and 6, having their rear ends downwardly curved, as usual, and provided with ordinary cultivator-teeth 7 and 8, capable of vertical and angular adjustment in a manner well understood in the art.

9 indicates what may be termed a "guide-bar," fixed at its center within the center beam 1 by nuts 10, screwed upon the guide-bar against the opposite faces of the beam. The ends of the guide-bar 9 extend through comparatively large openings 11 in the tooth-shanks 5 and 6 and are provided with terminal stops 12 to limit the outward pivotal movement of the shanks under the impulse of springs 13 and 14, encircling the guide-bar and bearing, respectively, at their opposite ends against the contiguous faces of the center beam 1 and the shanks 5 and 6.

15 and 16 indicate the upwardly and rearwardly inclined handles of the cultivator, secured at their lower ends to the shanks 5 and 6, preferably at a point immediately behind the guide-bar 9, and additionally secured by braces 16 and 17, extending from the handle to the shanks, at a point near the rear extremities of the latter.

The device as described may be considered the complete embodiment of my invention in its broadest aspect, since it comprehends a cultivator the teeth of which may be relatively adjusted laterally by the manipulation of the handles while the cultivator is in motion and without the necessity for releasing the grip upon the handle, which is necessarily maintained while the device is in use.

The springs 13 and 14 constantly urge the tooth-shanks 5 and 6 apart, and it is simply necessary to oppose the desired resistance to the resiliency of the springs by a lateral pressure upon the handles to accomplish the desired adjustment of the teeth 7 and 8. Inasmuch, however, as it is desirable in practice to have a greater number of teeth additional tooth-bars 19 and 20 may be fixed at their forward ends to the forward ends of the tooth-shanks 5 and 6, properly spaced therefrom, and similarly provided with teeth 21 and 22 and with braces 23 and 24, extending to the handles.

25 indicates still another tooth-shank adapted to be coupled to the rear extremity of the center beam and provided with a tooth 26. In this form the device resembles in general appearance an ordinary cultivator; but unlike devices of this class heretofore in use it may be instantly adjusted to any character of planting, whether the plant-rows are close or open, by simply regulating the width of the handles.

If desired, adjustment-nuts 27, extending through the tooth-shanks 5 and 6 and bearing upon the guide-rod 9, may be provided for the purpose of fixing the device in any desired adjustment, when constant readjustment of the device is unnecessary—for instance, when it is desired to cultivate a considerable extent of ground over which the planting is uniform. If a very narrow cultivator is desired, it is simply necessary to remove the outside teeth and their shanks by releasing the shanks and their stays from the inner tooth-shanks and handles, and if it is desired to employ the device as a marker and pulverizer it is simply necessary to uncouple the center tooth-shank and substitute therefor the shank of the marker, which serves to properly mark the ground, while the teeth 7 and 8 pulverize the earth on either side of the mark.

While the device as described constitutes the complete and perhaps the preferred embodiment of my invention, I do not desire to limit myself to the structural details defined, as it is obvious that many modifications might be effected without departing from the spirit of the invention—as, for instance, a greater number of tooth-shanks might be employed or a series of spring-actuated tooth-shanks might be located upon either side of the center beam and all be relatively adjusted by the movement of the handles, or several tooth-shanks might, for instance, be provided with couplings to permit the use of various forms of tooth or shovel plow shanks. I therefore desire to reserve to myself the right to make such changes, modifications, or variations as may come properly within the scope of the protection prayed.

What I claim is—

1. The herein-described cultivator, consisting of the wheeled frame, provided with the center beam, the side beams pivoted to said frame, operating-handles secured to said side beams, springs arranged between said center and side beams to press outwardly upon the side beams, and positive means for adjustably limiting the outward movement of said side beams with relation to the center beam, substantially as specified.

2. The herein-described cultivator, consisting of the wheeled frame provided with the center beam, the side beams pivoted to said frame, operating-handles secured to said side beams, the centrally-threaded bracing and guiding bar 9 engaging said center beam, nuts 10 engaging said threaded portion of said bar to secure same in place, elongated slots 11 in said side beams through which the end portions of said bar extend and in which they work, spiral springs surrounding said bar between said center and side beams, and adjustable stops carried by the end portions of said bar for limiting the outward movement of said side beams, substantially as specified.

In testimony whereof I affix my signature in presence of two witnesses.

JOHN T. CLARK.

Witnesses:
GEORGE W. HINTON,
JOHN F. ARNOLD.